D. C. JACKSON.
ELECTRICITY METER.
APPLICATION FILED FEB. 12, 1906. RENEWED MAY 11, 1910.
962,222.
Patented June 21, 1910.
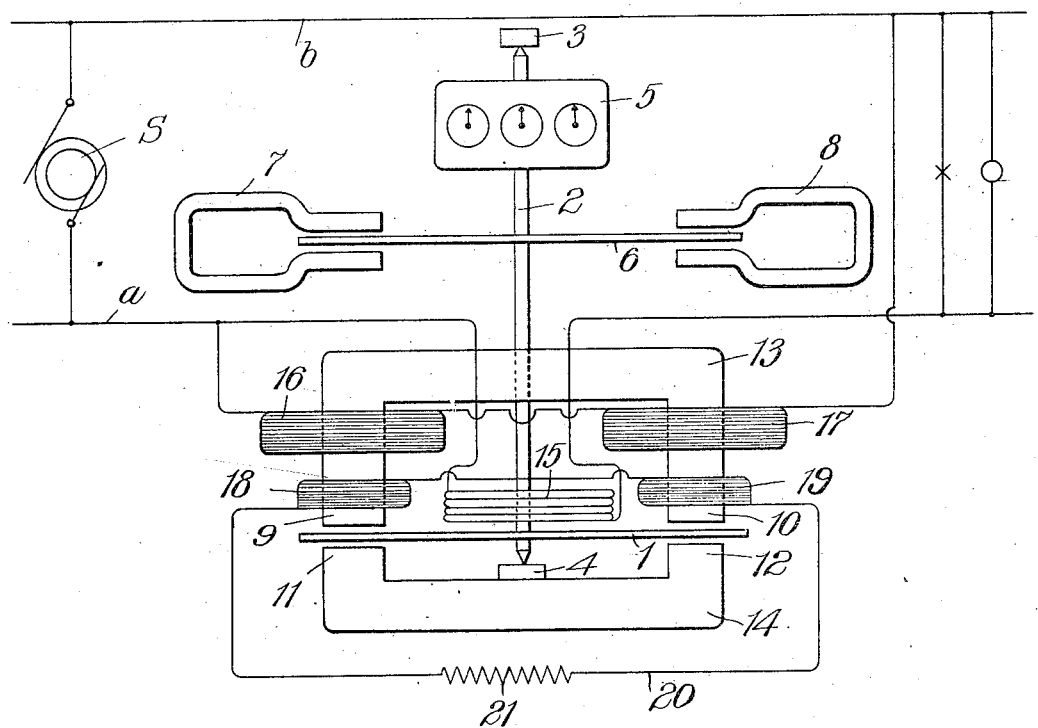

UNITED STATES PATENT OFFICE.

DUGALD C. JACKSON, OF MADISON, WISCONSIN, ASSIGNOR TO DUGALD C. JACKSON AND WILLIAM B. JACKSON, OF MADISON, WISCONSIN, A COPARTNERSHIP.

ELECTRICITY-METER.

962,222.

Specification of Letters Patent. Patented June 21, 1910.

Application filed February 12, 1906, Serial No. 300,688. Renewed May 11, 1910. Serial No. 560,730.

*To all whom it may concern:*

Be it known that I, DUGALD C. JACKSON, citizen of the United States, residing at Madison, in the county of Dane and State of Wisconsin, have invented a certain new and useful Improvement in Electricity-Meters, of which the following is a full, clear, concise, and exact description, reference being had to the accompanying drawings, forming a part of this specification.

My invention relates to electric meters, particularly to wattmeters and its object is to counteract the effect of the conditions which cause the meter's indications to vary with temperature.

The effect of temperature on wattmeter indications is produced in various ways. One is the change of resistance with variations of temperature. A second is the change of friction with a change of temperature. Another is the change of the artificial restraining moment with change of temperature.

In the accompanying drawing I have shown my invention applied to an induction meter.

The meter comprises an armature in the form of a disk 1 and mounted on a stem 2, which rotates in bearings 3 and 4 and connected at its upper end with the counting train 5 in a well known manner. The retarding disk 16 is also carried by the spindle and is spanned by the retarding magnets 7 and 8. The armature disk revolves between the poles 9—10 and 11—12 of the magnetic frames 13 and 14. The current winding 15 is in inductive relation with the armature as shown, and is included in the line limb *a*. The pressure coils 16—17 are carried by the magnetic frame 13, and are connected together and bridged between the line limbs *a—b* of the supply circuit fed by the alternating current generators. The phase adjusting windings 18 and 19 are also carried on the frame 13 and are connected together in a closed circuit 20. The pressure magnetism for the meter may be adjusted so that it has a phase exactly 90 degrees from the phase of the circuit pressure under conditions of standard temperature, the adjustment being effected by suitably adjusting the resistance of a resistance coil 21 included in circuit with the phase adjusting coils 18 and 19. As the temperature of the meter rises, the restraining moment decreases and the motive torque should therefore be caused to decrease in the same proportion. This may be brought about by constructing the resistance coil 21 of a material having a suitable temperature coefficient, so that, as the temperature changes, the magnetic field of the pressure coils is permitted to deviate slightly from quadrature with the main line pressure. Since the restraining moment decreases as the temperature rises, the deviation from 90 degrees ought to be in decreasing direction, while the angle ought to become a little greater than 90 degrees as the temperature falls below the standard temperature. The particular material to use in the composition of the automatically compensating moment resistance must depend upon the particular details of construction which are adopted in the particular meter under consideration. Copper will ordinarily serve the purpose, although iron wire will in some cases, be preferable and in other cases a material of a lower temperature coefficient may be sufficient to bring about the result. The meter may therefore be so adjusted that the motive torque automatically changes as the temperature of the meter changes, the said changes of the motive torque being substantially equal in extent and opposite in sign to the changes of the restraining moment which are caused by the changes in temperature and the meter indications are thereby caused to be substantially independent of temperature changes.

I claim as new and desire to secure by Letters Patent:—

1. In an electricity meter, the combination with a movable element, of torque producing circuits associated therewith, restraining means for controlling the movement of the movable element, variations in temperature of the meter causing variations in the restraining effort and in the speed of the movable element, and additional circuit means associated with the torque producing circuits, the temperature coefficient of said additional circuit means being such that the currents in the torque producing circuits are modified and the torque varied in accordance with variations of the restraining effort by the variations in temperature whereby said movable element may operate independently of temperature variations.

2. In an electricity meter, the combination with a movable element, of a torque producing winding therefor, changes in temperature tending to cause variation in the speed of the movable element, and an additional circuit in inductive relation to the torque producing winding having a temperature coefficient adjusted to influence the current flow through the torque producing winding in accordance with said temperature variations whereby the tendencies to speed variation will be counteracted.

3. In an electricity meter, the combination with a movable element, of shunt and series torque producing circuits therefor, variations in temperature tending to cause variations in speed of the movable element, and an additional circuit associated with the torque producing circuits having a temperature coefficient adjusted to influence the current through the torque producing circuits in accordance with said temperature variations whereby tendencies to variation in speed of the movable element will be counteracted by corresponding variations in the torque produced by the circuits.

4. In an electricity meter, the combination with a movable element, of pressure and current torque producing circuits therefor, variation in temperature tending to cause variation in speed of the movable element, and an additional circuit associated with the pressure circuit having its temperature coefficient adjusted to modify the current flow through the pressure winding whereby the torque is varied to counterbalance tendencies to variations in speed of the movable element.

5. In an electricity meter, the combination with a movable element, a magnetic circuit for said element, windings coöperating with the magnetic circuit to produce torque for driving the movable element, variations in temperature tending to vary the speed of the movable element, a closed secondary circuit associated with the windings and magnetic circuit, and a heat responsive element in said secondary circuit for changing the current flow therethrough in accordance with changes in temperature whereby the speed is maintained constant.

In witness whereof, I hereunto subscribe my name this eighth day of February A. D., 1906.

DUGALD C. JACKSON.

Witnesses:
CHARLES J. SCHMIDT,
LEONARD W. NOVANDER.